Figure 1:
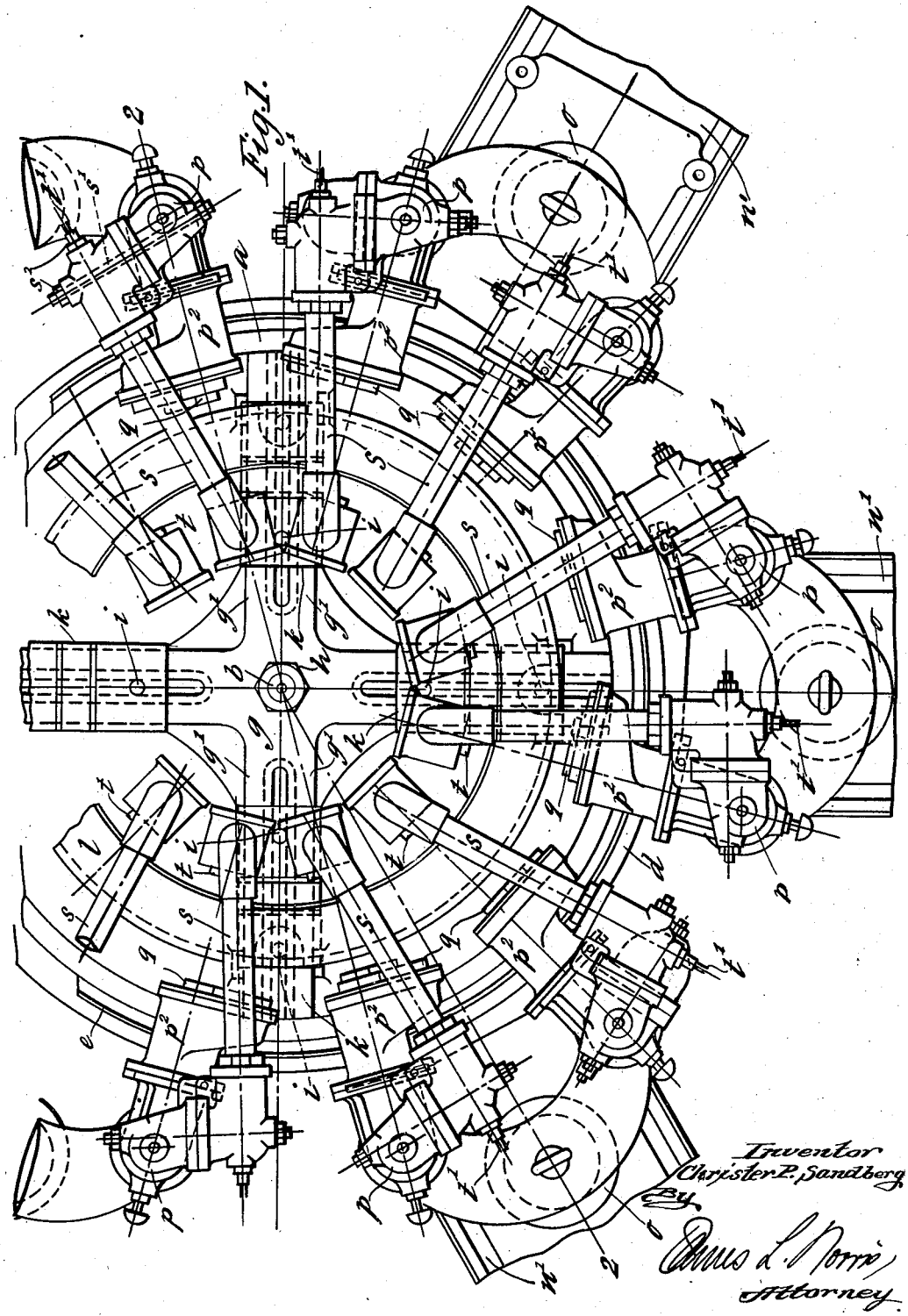

Jan. 27, 1925.  
C. P. SANDBERG  
HEAT TREATMENT OF STEEL TIRES AND WHEELS  
Filed Nov. 25, 1922   2 Sheets-Sheet 1

1,524,578

Inventor
Christer P. Sandberg
By
James L. Norris
Attorney.

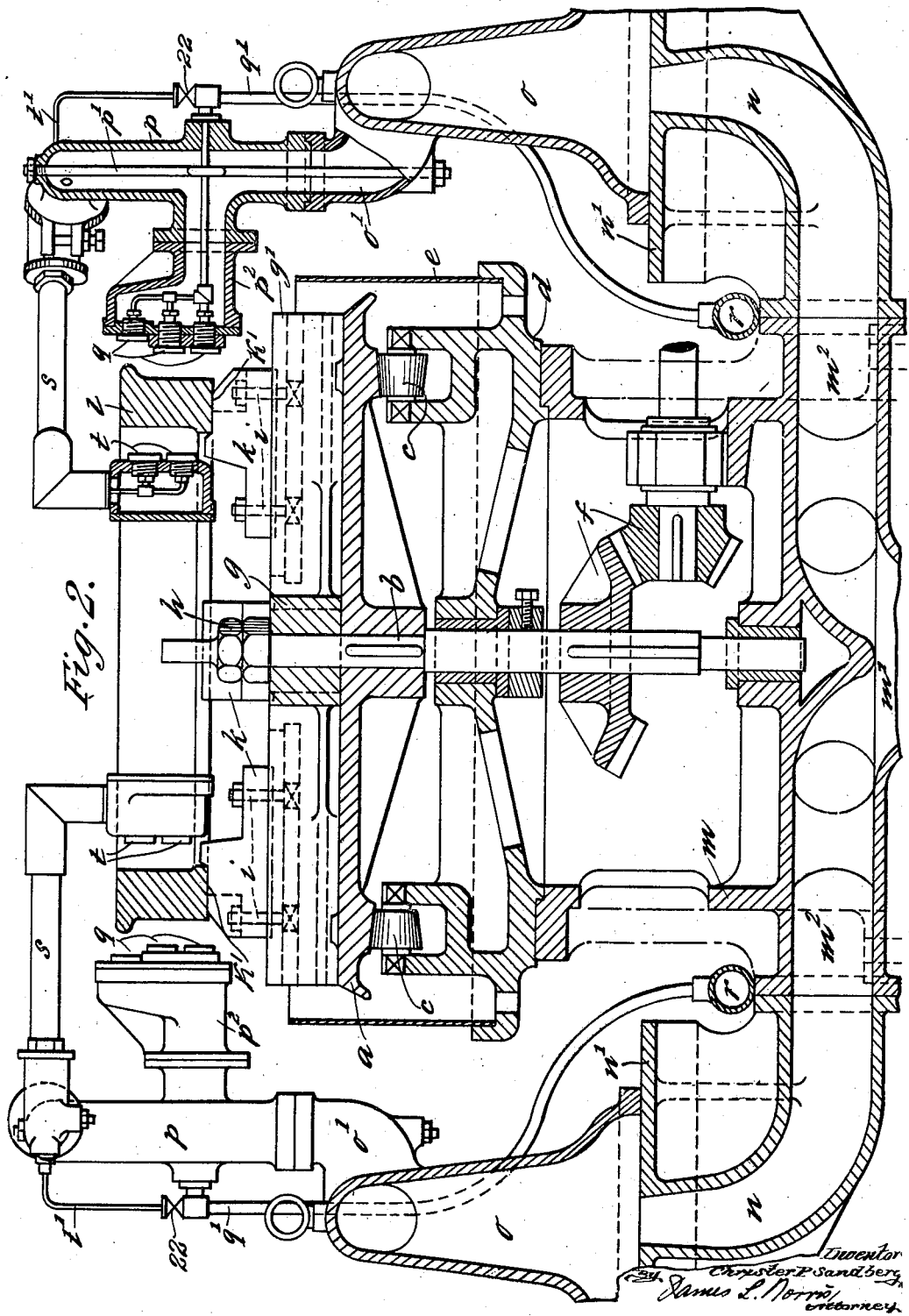

Patented Jan. 27, 1925.

1,524,578

UNITED STATES PATENT OFFICE.

CHRISTER P. SANDBERG, OF LONDON, ENGLAND.

HEAT TREATMENT OF STEEL TIRES AND WHEELS.

Application filed November 25, 1922. Serial No. 603,295.

*To all whom it may concern:*

Be it known that I, CHRISTER PETER SANDBERG, a subject of the King of Great Britain, residing in London, England, have invented certain new and useful Improvements in the Heat Treatment of Steel Tires and Wheels, of which the following is a specification.

The heat treatment to which steel tires and solid wheels are subjected during their manufacture tends to leave them in such a condition that should fracture occur there is a tendency for the tire to leave the body of the wheel, or, in the case of a solid wheel, for the tire portion to open.

I have found that if the tire or solid wheel is cooled both on its external and on its internal periphery, under adequately controlled conditions, the internal stresses or the molecular structure, or both, of the tire or wheel can be so modified that when a break occurs the tire tends to grip the body of the wheel rather than to leave it, and in the case of a solid wheel the tire portion tends to close rather than to open.

According to this invention a tire or wheel is subjected to heat treatment in such a manner that on the one hand a hard and tough, sorbitic structure is formed from the external periphery to any desired depth, and on the other hand the tire is left in such a state of internal stress that while it will, if fractured, still exert a tight, gripping action on the wheel centre, yet the maximum value of the stresses at any point will not exceed a safe limit.

For this purpose the tire or solid wheel while hot is subjected to the cooling effect of jets or sprays of elastic fluid or atomized liquid both on the external periphery and on the internal periphery. The number of jets or the volume of cooling medium which they deliver will determine the rate at which the tire cools; this rate will be determined for the external periphery by the conditions of hardness there required, and for the internal periphery by the necessity for correcting the stresses produced in the outer and inner parts of the tire by the cooling of the external periphery, the object being to produce a state of compression in the outer part and of tension in the inner part, having regard to the elastic limit of the steel.

In the accompanying drawings, Fig. 1 is a plan of a machine for treating wheels or tires according to the invention, Fig. 2 is a vertical section on line 2—2 of Fig. 1.

The machine comprises a circular table $a$ mounted to rotate with a vertical shaft $b$ and supported by rollers $c$. The latter and shaft $b$ are mounted in a stationary frame $d$ which also carries a cylindrical guard $e$. The shaft is driven by the bevel gear $f$. A casting $g$ carrying four arms $g^1$ is threaded on shaft $b$ and is clamped to the table by nut $h$. Each arm $g^1$ is slotted to receive bolts $i$ by means of which a block $k$ can be held at an adjustable distance from the axis of shaft $b$. All the blocks being fixed at the same distance from the said axis, a tire $l$ of corresponding internal diameter can be supported on the shoulders $k^1$ of the blocks, so as to be incapable of displacement, and will be carried round with the table $a$.

The frame $d$ is mounted on a cylindrical casting $m$ having a hollow base at the centre of the bottom of which is a tubulure $m^1$ for attachment of a windpipe; on the periphery of the hollow base are tubulures $m^2$ for attachment of pipe bends $n$. The upper ends of these bends terminate in plates $n^1$ constituting guideways in which the bases of hollow pedestals $o$ can slide substantially air-tight. The pedestals $o$ have upwardly turned branches $o^1$ each of which carries a hollow casting $p$ bolted to it by a bolt $p^1$. A branch $p^2$ of the casting $p$ carries nozzles $q$ for delivering sprays of atomized water (preferably nozzles of the form described in British Specification No. 166,341), the water being supplied by pipe $q^1$ connected with a water main $r$. The upper part of the casting $p$ carries a pipe $s$ adapted to turn about a bolt $s^1$ when nut $s^2$ is loosened. The free end of this pipe is bent at right angles downwards and carries nozzles $t$ similar to nozzles $q$ and fed with water from main $r$ through pipe $t^1$ which extends through the pipe $s$.

To place a hot tire $l$ in position, pipes $s$ are turned about bolts $s^1$ away from the centre of the machine until a clear passage is obtained for lowering the tire on to the blocks $k$. When the tire is in place pipes $s$ are returned to the position shown. The gear $f$ is now started so that the tire revolves on its axis. At the same time air is forced through the wind pipe to pass into the casting $m$ and thence into pedestals $o$ and through nozzles $q$ and $t$, which are also fed with water from pipe $r$. The air and atomized water play upon both the outside and the inside periphery of the tire and cool it as desired.

The amount of cooling medium used upon the exterior periphery is governed by a valve in the circular pipe $r$ in accordance with the degree to which it is desired to raise the hardness of the running surface of the tire or wheel above that which it would possess if slowly cooled from the critical range, whilst the depth to which the hardening penetrates may be governed by the time during which the jets are allowed to play. In all cases, however, the object is to cool at such a rate that a sorbitic structure is obtained.

The amount of cooling medium applied to the internal periphery is governed by valves $u$ in accordance with the state of internal stress which it is desired to leave in the tire. Thus, if the rate of cooling were equal in both peripheries the tire, when cold, would have no tendency when cut or fractured either to contract or to expand. If outside cooling only were used the maximum effect of contraction when cut would be produced, but in cases where the maximum hardness of the sorbitic structures was desired, the stresses so formed might be in excess of those required or desirable. By employing both external and internal cooling, however, both hardness and stresses can be controlled independently as desired, and a tire with any required tendency to contract can be produced.

It will be understood that the conditions of cooling are ascertained by preliminary experiment on one or more tires of the dimensions and quality of the batch which is to be improved by the treatment.

As an illustration of the variation in the contraction on cutting which can be obtained by variations in the amount of cooling medium applied to the external and internal peripheries respectively, the following experiment may be quoted:—

Three tires of similar size (3 feet diameter, 5 inches x 3 inches cross section) and composition (0.70% carbon, 0.80% Mn) were treated on a machine such as illustrated above.

Tire A was cooled from the outside only, with fairly drastic treatment. Its hardness in the neighbourhood of the tread was raised from 250 Brinell to 340 Brinell. On cutting out a radial slice the faces closed in 3 inches.

Tire B was cooled externally and internally, the total amount of cooling agent being smaller than that used for externally cooling tire A, and the amount used externally being greater than the amount used internally. The hardness near the tread was raised to 300 Brinell, and on cutting out a radial slice the faces closed in 1¾ inches.

Tire C was treated with about the same amount of cooling agent externally as tire B, but the amount of cooling internally was increased. The hardness was (as in tire B) raised externally to 300 Brinell and, on cutting, the faces closed in ⅜ inch.

Tire A would be in a condition of stress the intensity of which would be undesirable in practice; tire B would also be in an unnecessarily high condition of stress; tire C on the other hand would be safe in respect of its internal stresses and would close in sufficiently should fracture occur.

This illustration indicates how, by the method of treatment described, both hardness and stresses can be varied independently as may be desired.

The re-heating of tires for the purpose of shrinking on to the wheel centres can, and undoubtedly should be, done so that the maximum temperature attained never arrives at a point at which internal stresses already present in the tire will be appreciably modified or reduced. Thus, the re-heating of the tire for shrinking on, will not interfere with the closing-in property present in a tire treated according to the present invention.

Additional stresses are, of course, put in the tire while it is cooling on the wheel centre. In general these stresses will be of opposite sign to those present in tires treated according to the present invention, so that there is no danger that stresses put into the tire during treatment will be unduly augmented when a tire is shrunk upon a wheel centre.

Having thus described the nature of the said invention and the best means I know of carrying the same into practical effect, I claim:—

1. A process of improving steel tires and wheels which consists in cooling from a temperature above that of the critical range and with independent adjustment of the cooling velocities both the external periphery and the internal periphery of the tire or wheel, the rate of cooling being such that on the one hand a hard and tough sorbitic structure is formed to the desired depth from the external periphery and on the other hand the tire is left in such a state of internal stress that should it be fractured it will tend to contract in diameter but is not left in an unsafe condition of internal stress.

2. A process of improving steel tires and wheels which consists in directing jets of cooling medium on the external periphery and on the internal periphery of the tire so as to cool it from a temperature above that of the critical range, the amount of medium delivered in unit time by the jets being adjusted to produce a tough sorbitic structure to the desired depth from the external periphery and so to cool the internal periphery that the stresses produced by the cooling of the external periphery are reinforced or corrected to produce a state of compression in the outer part and of tension in the inner part of the tire.

In testimony whereof I have signed my name to this specification.

CHRISTER P. SANDBERG.